United States Patent
Eckhard et al.

(10) Patent No.: US 12,292,076 B2
(45) Date of Patent: May 6, 2025

(54) ANCHORING A FIRST OBJECT IN A SECOND OBJECT

(71) Applicant: MultiMaterial-Welding AG, Stansstad (CH)

(72) Inventors: Gregor Eckhard, Rüschlikon (CH); Erwin Kaca, Basel (CH); Jörg Mayer, Niederlenz (CH); Martin Rhême, Belfaux (CH)

(73) Assignee: MultiMaterial-Welding AG, Stansstad (CH)

( * ) Notice: Subject to any disclaimer, the term of this patent is extended or adjusted under 35 U.S.C. 154(b) by 447 days.

(21) Appl. No.: 17/431,461

(22) PCT Filed: Feb. 14, 2020

(86) PCT No.: PCT/EP2020/053964
§ 371 (c)(1),
(2) Date: Aug. 17, 2021

(87) PCT Pub. No.: WO2020/169484
PCT Pub. Date: Aug. 27, 2020

(65) Prior Publication Data
US 2022/0136554 A1    May 5, 2022

(30) Foreign Application Priority Data
Feb. 18, 2019    (CH) .................................. 00205/19

(51) Int. Cl.
*F16B 37/12*    (2006.01)
*B29C 65/00*    (2006.01)
(Continued)

(52) U.S. Cl.
CPC ............ *F16B 37/125* (2013.01); *B29C 65/08* (2013.01); *B29C 66/21* (2013.01);
(Continued)

(58) Field of Classification Search
CPC .. F16B 5/01; F16B 13/02; F16B 37/04; F16B 37/06; F16B 37/061; F16B 13/141;
(Continued)

(56) References Cited

U.S. PATENT DOCUMENTS

2014/0010588 A1* 1/2014 Clinch .................... F16B 13/02
                                                                    403/270
2019/0358908 A1* 11/2019 Sankaran .......... B29C 66/30321

FOREIGN PATENT DOCUMENTS

DE    20 2017 106724 U1    12/2017
GB           778327 A  *    3/1957
(Continued)

OTHER PUBLICATIONS

International Search Report and Written Opinion issued May 6, 2020 in International Application No. PCT/EP2020/053964.

*Primary Examiner* — Carson Gross
(74) *Attorney, Agent, or Firm* — MEDLER FERRO WOODHOUSE & MILLS PLLC

(57) ABSTRACT

A method of anchoring a first object in a second object is described. The first object extends along an axis between a proximal end and a distal end and has a circumferential surface. The circumferential surface comprises at least one helical protrusion of a thermoplastic material. For anchoring, the first object is brought in contact with the second object, and mechanical vibration is coupled into the first object from a proximally facing coupling-in face thereof so as to drive the first object into the second object in a manner that the vibration and pressing cause the first object to be subject to a helical movement relative to the second object and cause thermoplastic material of the first object to become flowable and to penetrate into structures of the second object to yield, after resolidification, a positive fit connection with the second object.

17 Claims, 4 Drawing Sheets

(51) Int. Cl.
*B29C 65/08* (2006.01)
*F16B 33/00* (2006.01)

(52) U.S. Cl.
CPC .. *B29C 66/30223* (2013.01); *B29C 66/30326* (2013.01); *B29C 66/474* (2013.01); *B29C 66/71* (2013.01); *B29C 66/7212* (2013.01); *B29C 66/72141* (2013.01); *B29C 66/72143* (2013.01); *B29C 66/72321* (2013.01); *B29C 66/727* (2013.01); *B29C 66/7392* (2013.01); *B29C 66/8322* (2013.01); *B29C 66/92921* (2013.01); *B29C 66/9513* (2013.01); *B29C 66/9517* (2013.01); *F16B 33/006* (2013.01)

(58) Field of Classification Search
CPC . B29C 65/08; B29C 66/474; B29C 66/30223; B29C 66/30221; B29C 66/72525; B29C 66/727
See application file for complete search history.

(56) References Cited

FOREIGN PATENT DOCUMENTS

| | | | |
|---|---|---|---|
| WO | 94/04834 A1 | 3/1994 | |
| WO | WO-2009074217 A2 * | 6/2009 | ........... B29C 33/446 |
| WO | 2016054751 A1 | 4/2016 | |
| WO | 2018015527 A1 | 1/2018 | |
| WO | 2018135996 A1 | 7/2018 | |

* cited by examiner

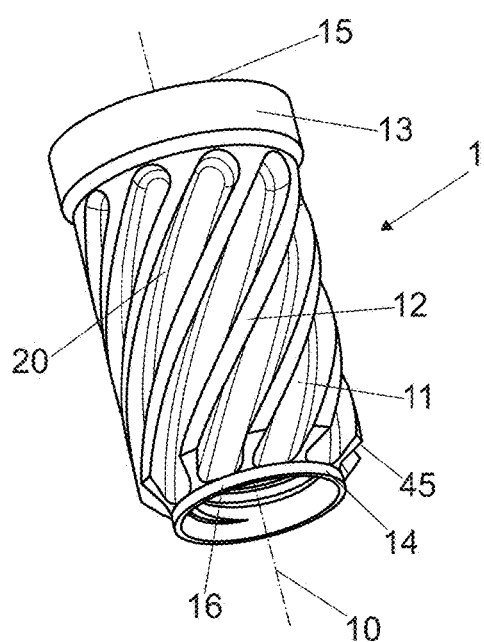
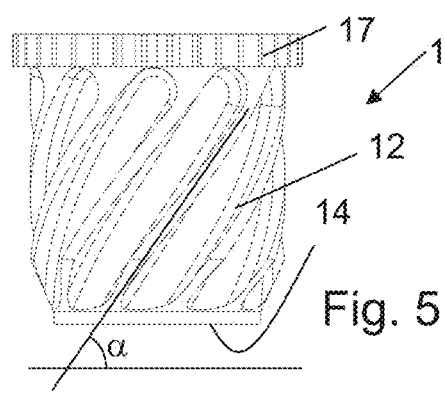
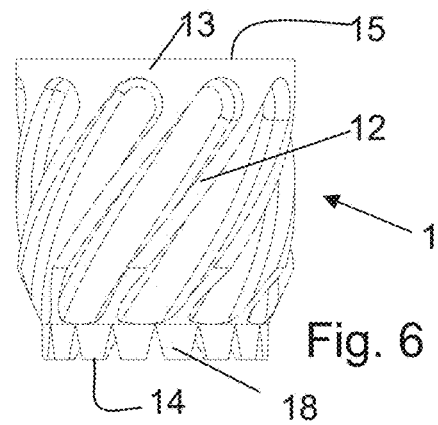
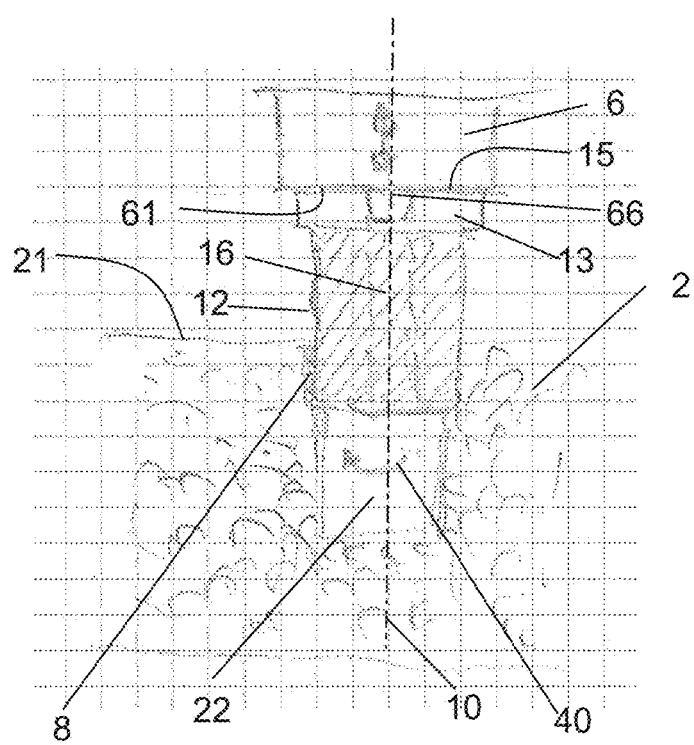
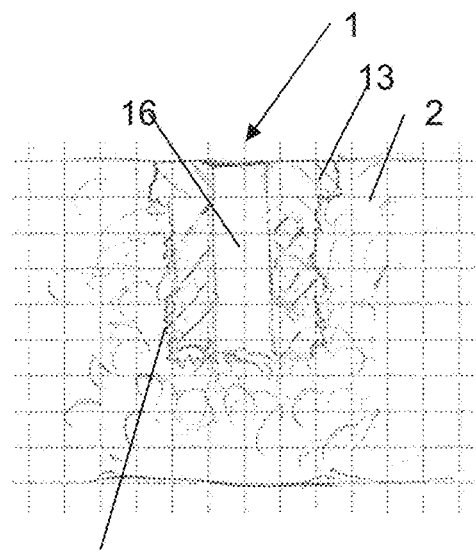
Fig. 1
Fig. 5
Fig. 6
Fig. 2
Fig. 4

ANCHORING A FIRST OBJECT IN A SECOND OBJECT

FIELD OF THE INVENTION

The invention is in the fields of mechanical engineering and construction, especially mechanical construction, for example automotive engineering, aircraft construction, shipbuilding, machine construction, toy construction etc. In particular, it relates to a method of—mechanically—anchoring a first object in a second object.

BACKGROUND OF THE INVENTION

In the automotive, aviation and other industries, there has been a tendency to move away from steel-only constructions and to use lightweight material instead.

An example of new building material elements are lightweight building elements that comprise two outer, comparably thin building layers, for example of a fiber composite, such as a glass fiber composite or carbon fiber composite, a sheet metal or also, depending on the industry, of a fiberboard, and a middle layer (interlining) arranged between the building layers, for example a honeycomb structure of cardboard or other material, or a lightweight metallic foam or a polymer foam or ceramic foam, etc., or a structure of discrete distance holders. Lightweight building elements of this kind may be referred to as "sandwich boards" and are sometimes called "hollow core boards (HCB)". They are mechanically stable, may look pleasant and have a comparably low weight.

Another category of new building material elements is elements of a brittle, comparably dense foam, such as a dense Polyurethane (PU) or Polyethylene terephthalate (PET) foam.

Often, these two categories are combined in construction elements in that a sandwich board has the interlining layer made of such a hard foam.

A further category of new materials are textiles, i.e. structures of artificial or natural fibers, including felt, webs, meshes, wovens, nettings, etc.

All these categories of materials have in common that they offer relatively little anchoring strength if a conventional fastener, such as a screw pin or rivet, is fastened thereto. The new materials therefore cause new challenges in bonding elements of these materials to each other and to other elements.

To meet these challenges and eliminate possible disadvantages, the automotive, aviation and other industries have started heavily using adhesive bonds. Adhesive bonds can be light and strong but suffer from the disadvantage that there is no possibility to long-term control the reliability, since a degrading adhesive bond, for example due to an embrittling adhesive, is almost impossible to detect without entirely releasing the bond. Also, adhesive bonds may lead to a rise in manufacturing cost, both, because of material cost and because of delays caused in manufacturing processes due to slow hardening processes, especially if the surfaces to be connected to each other have certain roughness and as a consequence the quickly hardening thin-layer adhesives cannot be used. Finally, because it is effective only at the surface, an adhesive bond cannot be stronger than a material strength at the surface. Especially for anchoring relative to brittle or highly elastic objects, adhesive bonds are therefore not suitable.

In accordance with another approach according to the prior art, anchoring in objects of dense, brittle foam is primarily done by screws with a relatively high thread pitch and a relatively high thread depth. However, due to its properties, such dense foam tends to crack when a screw is driven into it, and this severely limits the achievable anchoring strength.

SUMMARY OF THE INVENTION

It is therefore an object of the present invention to provide a method of anchoring a first object—for example a connector—in a second object, the method overcoming disadvantages of prior art methods. Especially, it is an object of the present invention to provide a method of mechanically anchoring a first object in a second object being of a for example brittle and/or low strength material, the method yielding a satisfying anchoring strength.

In accordance with an aspect of the invention, a method of anchoring a first object in a second object is provided. In this, the first object extends along an axis between a proximal end and a distal end and has a circumferential surface extending around the axis. The circumferential surface comprises at least one helical protrusion, for example at least two protrusions or at least three protrusions, of a first, for example thermoplastic material. The protrusion may be rib-shaped and/or wing-shaped. For anchoring, the first object is brought in contact with the second object, and mechanical vibration is coupled into the first object from a proximally facing coupling-in face thereof so as to drive the first object into the second object in a manner that the vibration and pressing cause the first object to be subject to a helical movement relative to the second object.

In this, the helical protrusions are caused to penetrate into material of the second object, which material remains solid. The helical protrusion thus eat into the material of the second object and cause a helical groove therein, so that a thread-like connection results.

Especially, this material of the second object may be brittle, whereby the driving of the protrusions into the material causes the material to be abraded where the protrusions drive into it, so that the protrusions create a groove, and a thread-like connection between the protrusions and groove is created.

In a group of embodiments, the mechanical vibration is also coupled into the first object to cause thermoplastic material of the first object to become flowable and to penetrate into structures of the second object to yield, after re-solidification, a positive fit connection with the second object. Thereby, in addition to the thread-like connection also a positive-fit connection is caused. This positive-fit connection may have the effect of securing the first object against being rotated relative to the second object, so that the first object is secured to the second object by a combined thread connection and positive-fit anchoring.

In a group of alternative embodiments, no material of the first object is made flowable. Especially in this group, the material of the helical protrusion need not be thermoplastic.

In contrast to anchoring screws according to the prior art, therefore, it is not a torque exerted on the first object (connector) that drives the first object into the second object, but mechanical vibration, especially longitudinal vibration (i.e. vibration with primary movements along the axis). It has turned out that due to this approach, the tendency of the second object to become locally damaged beyond the groove created by the protrusions (by cracks etc.) by the first object being driven into it is strongly reduced compared to prior art screwing approaches.

In addition, the anchoring strength is substantially enhanced, especially if the mechanical vibration in addition to driving the first object into the second by a helical movement also cause additional anchoring by thermoplastic material of the first object penetrating into structures of the second object.

Especially the sonotrode, by which the vibration is coupled into the first object, may just act to hammer onto the coupling-in face, and every strike of the hammer drives the first object slightly further into the second object. During the retraction part of the vibration cycle, there is then no direct coupling between the sonotrode and the first object. A (slight) pressing force by which the sonotrode is held against the first object mainly serves for the sonotrode to move up, i.e. during the retraction part of the cycle, the pressing force may cause the sonotrode to move forward by the distance by which the first object has been further driven into the second object during the last forward part of the vibration cycle. This does not exclude the possibility that the pressing force is adapted to specific requirements, i.e. depending on the situation the pressing force may be larger or smaller.

In embodiments, the interaction between the first and second objects in response to the vibration—and slight pressing force on the sonotrode—may be that of a slip-stick movement of the first object relative to the second object, wherein during the retraction part of the vibration cycle the first object remains immovable relative to the second object.

The moving forward of the first object relative to the second object may be a moving of the first object into an opening in the second object.

In this, such opening may be pre-made, for example by drilling. Then, the pre-drilled opening will generally have a smaller diameter than the outer diameter of the first object (at least of the helical protrusion(s) thereof). The depth (axial extension) of the pre-drilled opening may optionally be smaller than a length of the first object (or a portion thereof what during the process is driven into the second object), whereby at least towards the end of the anchoring process the distal end of the first object is pressed against the bottom of the opening, so that optionally the distal-most portion of the first object may become flowable also and interpenetrate structures of the second object at the bottom of the opening. Alternatively, the depth of the opening may be equal to or greater than the length (axial extension) of the first object. It is also possible that the opening is a stepped bore, for example with a step for accommodating a proximal broadening feature, such as a proximal collar as mentioned hereinafter.

The opening in this will generally be cylindrical, especially by having the shape of a circular cylinder.

Also the outer lateral surface of the first object (the part that carries the at least one helical protrusion) may have the shape of a circular cylinder.

The combination of a pre-made opening with a (circular) cylindrical shape with a first object having a (circular) cylindrical lateral outer surface is particularly advantageous. By this combination, a solid anchoring along the full depth may be achieved, and at the same time, in contrast to for example arrangements with a conical opening and a conical first object, the required power is essentially continuous during the anchoring process, the distal end of the helical protrusion eating continuously into material of the second object.

According to an alternative, the opening may be not pre-made but may be created by the driving of the first object into the second object by the effect of the mechanical vibration (and pressing force on the sonotrode). To this end, the first object, which may be overall sleeve shaped (at least at the distal end), may comprise a distal punching surface portion (or 'punching edge'). Such punching edge may be sharp and form an uninterrupted contour around the axis or may for example be teethed. Such punching edge structure may especially be advantageous if the second object has a comparably soft and/or elastic material.

In addition or as an alternative to a punching edge, the first object may comprise a distal guiding or piercing feature, similar to a tip of a nail, for guiding the first object when it inserted into the opening and/or for making the opening. This may especially be an option for comparably soft second object materials.

The sonotrode that for example couples the vibration into the first object may have a guiding protrusion cooperating with the first object to laterally guide it. Apart from the coupling-in face and the coupling-out face and optionally such lateral guiding feature, the sonotrode and first object do in many embodiments not have any common coupling structure. Especially, in many embodiments they do not have any torque transmitting (angle determining) structure.

In alternative embodiments, the sonotrode does not have any guiding feature but has a distal end face that is, in a region of contact with the first object, essentially flat.

The second object may comprise any material mentioned in this text. Especially, the second object may comprise a brittle foam material in which the first object is anchored. A brittle material is a material that when subject to stress breaks without substantial elastic deformation. Especially, the brittle foam material may be foam material of comparably high density, such as a brittle PU or PET foam.

In any case, the second object may be porous.

The part of the second object in which the first object is anchored may consist of the mentioned material. Alternatively, the part of the second object may comprise further elements. For example, the second object may comprise a lightweight building element with two comparably hard, thin layers of comparably high strength that sandwich a low strength material, such as a brittle foam or being another porous material.

The method may comprise driving the first object into the second object until the proximal end of the first object is flush with a proximally facing surface of the second object or driving the first object even further into the second object. Alternatively, the first object may comprise a part that sticks out from the second object after the anchoring process is finished. Such proximal part may optionally comprise a head with a distally facing stop face.

In embodiments, for example embodiments in which the second object has a relatively hard building layer proximally of the weak material (such as the proximal layer of a lightweight building element) or also embodiment in which a proximal surface of the second object is constituted by a foam material, the first object may have a proximal collar with energy directing structures, such as ribs. Such ribs may be axial. Alternatively, such ribs may be helical, with for example a same helix angle as the protrusion(s). The method may then comprise causing the proximal collar to be in physical contact with a mouth of the opening in which the first object is anchored, during the step of coupling the mechanical vibration into the first object, for example towards the end of this step. The direct contact together with the mechanical vibration will, in these embodiments, cause thermoplastic material of the proximal collar to become flowable and to interpenetrate structures of the second object around the mouth. Especially if the first object has a high-strength proximal layer, this will considerably enhance the anchoring strength.

As an alternative, ribs, for example axial ribs, of the above-discussed kind need not act in an energy directing manner during the last stage of the process. Rather, depending on the second object material, such ribs may merely serve for being pressed into the second object material around a mouth of the opening to serve, after the end of the process, for securing against rotation. Such ribs may absorb angular momenta upon the first object with respect to both possible rotation directions.

Also the distal end of the first object may be anchored in the second object and may to this end have distal energy directing structures comprising the thermoplastic material. Coupling the mechanical vibration into the first object may then cause material of the distal energy directing structures to become flowable and to interpenetrate structures of the second object at the distal end of the first object.

Such distal energy directing structure may comprise a distal toothed rim or a circumferential distal edge.

The first object as an alternative to having a proximal collar with energy directing structures may have a proximal collar with a smooth circumferential surface. Generally, a collar in addition or as an alternative to providing liquefiable material for anchoring at the mouth of the opening may also serve to prevent material of the first object and/or of the second object from exiting out of the opening backwardly towards proximally. I.e. a collar may in addition or as an alternative to having energy directing properties have sealing properties.

The first object may have an opening open towards distally, for example a through opening whereby the first object is overall sleeve shaped.

The first object may be a connector. To this end, it may comprise a fastening structure, such as a thread, a bayonet coupling structure or other fastening structure for a further object to be fastened thereto. It may in addition or as an alternative comprise a head that serves for holding a further object against the first object so as to connect it thereto.

The first object or at least an outer circumferential surface thereof may consist of the thermoplastic material.

As an alternative to consisting of the thermoplastic material, the first object may comprise a body of a non-liquefiable material. Such body may form an inner portion and may be circumferentially enclosed by a thermoplastic portion that has the protrusions. Such body may have a fastening structure—such as an inner thread—accessible from outside, also after the end of the anchoring process.

A body of the non-liquefiable material may have an engagement structure into which thermoplastic material of the thermoplastic portion engages to secure the thermoplastic portion to the body of non-liquefiable material in a positive-fit manner with respect to axial directions.

In the embodiments with a non-liquefiable body, the body of the non-liquefiable material is different from a mere filler of a large number of particles but is a macroscopic body with a defined position and orientation and of a substantial size of for example at least 10% of a first object volume, and/or with a characteristic dimension of at least 0.1 mm in any dimension. Especially, the body may be metallic or of ceramics. Especially, the body may be such as to have a defined shape and to thereby add stiffness to the first object. By the body, the first object is defined into at least two spatially separated regions, namely the body region and the thermoplastic region.

Such a body of not liquefiable material may carry structures serving for further functions, such as a thread, another mechanical connection, etc.

As an alternative to comprising a body of non-liquefiable material—or in addition thereto—the first object may be anchored together with an initially separate inner connector element that for example has a fastening structure. Such inner connector element may be based on the principle as described in Swiss patent application 00871/18. It may be shaped so as to be enclosed by the first object being a sleeve-shaped thermoplastic element and comprise a radial outer feature, such as a bulge. A proximally facing face formed thereby may serve as support face for a corresponding face, for example the distal end face, of the first object to be pressed against during the anchoring process to cause thermoplastic material of the first object to be made flowable also at the interface with the support face. Due to the pressing, the radial outer feature acts to displace the thus flowable thermoplastic material radially outward into structures of the surrounding material of the second object to assist, after re-solidification, anchoring.

The proximally facing coupling-in face of the first object may be a proximal end face defining the proximal end (optionally with a guiding indentation or guiding protrusion). Alternatively, the coupling-in face may be a shoulder (perpendicular to the axis or for example tapering), the first object comprising portions proximally of the coupling-in face.

The first object, in contrast to screws according to the prior art, may not just have one helical protrusion but at least two or a larger number of at least three, for example at least four, at least five, at least six or more. For example, the individual protrusions in contrast to screw threads do not wind around a full periphery of the first object (i.e. do not encompass the entire circumferential surface) but are steeper. Also, a cross section of the protrusions may be approximately rectangular or form a vaulted shape, with an aspect ratio of at least 0.5 in most embodiments, for example at least 1 or at least 1.5 or at least 2 (If the width w is not constant as a function of the radial position, for the aspect ratio a mean value is used for the width when calculating the aspect ratio), and with a cross section that does not necessarily continuously decrease towards radially-outward. For example, the protrusions may have an approximately rectangular cross section. In special embodiments, the width even increases as a function of the radial position, i.e. the width may be larger at more radial-outer positions than at the base radially-inward. The helix angle, defined as the angle to the plane perpendicular to the axis (i.e., helix angle $\alpha=\arctan(l/2\pi r)$, l being the lead of the helix, and r its radius), is for example at least 30°, especially at least 40° or 45°, i.e. relatively steep in comparison to a thread.

In embodiments, the protrusions may especially be designed for yielding a self-stabilizing situation during the process, especially if the process is carried out without any axial guidance. To this end, the number of protrusions may be two (the two protrusions especially being separated by 180°) or three (the three protrusions especially being separated by 120°) or four, etc. For example, the number of protrusions may be at least three. In embodiments, the protrusions are separated from each other by an angle of 360°/n where n is the number of protrusions.

In embodiments, the cross section of the protrusions—or at least one of the protrusions—is not constant along their extension. For example, the cross section may, in a portion (being a sub-section or extending along the full length) increase as a function of the distance from the distal end. For example, the height (radial extension) may increase as a function of the distance from the distal end.

In embodiments, the protrusions differ from each other. For example, each of the following properties or combinations thereof may vary:
Cross section;
Height;
Position dependence of cross section/height;
Surface roughness or position dependence of surface roughness;
Distal onset, i.e. position at which the respective protrusion ends distally.

Especially, combinations in which these properties are different may add to anchoring stability in certain situations as explained in more detail hereinafter referring to figures. In contrast to these properties, the helix angle will generally be equal for all protrusions and will be constant along the extension of the protrusions.

Features of the first object (especially connector) described, defined and/or claimed in this text may relate to the method also, i.e. the method may be carried out using any first object described or defined in this text. Vice versa, features of the method described, defined and/or claimed in this text may apply to the first object (especially connector), i.e. the invention concerns first object having any property defined or described in this text, be it referring to the method or be it referring to a connector for carrying out the method.

In addition to the method and a connector suitable as first object in the method, the present invention also concerns a set of a first object with the properties defined or described in the present text, and of a sonotrode suitable for being used in the method. For example, a sonotrode having a substantially flat distal end face as outcoupling face may be used—with or without a guiding protrusion as mentioned hereinbefore.

For applying a counter force to the pressing force, the second object may be placed against a support, for example a non-vibrating support. In embodiments, the second object is placed against a support with no elastic or yielding elements between the support and the second object, so that the support rigidly supports the second object.

The material of the second object may for example comprise a macroscopic, dedicated structure with a large portion of hollow spaces, whereby the density of the second object is comparably small.

More generally, in embodiments, the second object has a portion of a material that is penetrable by the thermoplastic material. Therein, in the step of causing the flow portion to flow comprises causing material of the flow portion to penetrate into the structures, whereby, after re-solidification, a positive-fit connection between the first object and the second object is achieved.

The material of the second object suitable for the process may be solid at least under the conditions of the method according to the invention. It further comprises (actual or potential) spaces into which the liquefied material can flow or be pressed for the anchoring. Alternatively the penetrable material is capable of developing such spaces under the hydrostatic pressure of the liquefied thermoplastic material, which means that it may not be penetrable or only to a very small degree when under ambient conditions. This property (having potential spaces for penetration) implies e.g. inhomogeneity in terms of mechanical resistance. An example of a material that has this property is a porous material whose pores are filled with a material which can be forced out of the pores, a composite of a soft material and a hard material or a heterogeneous material in which the interfacial adhesion between the constituents is smaller than the force exerted by the penetrating liquefied material. Thus, in general, the penetrable second object material comprises an inhomogeneity in terms of structure ("empty" spaces such as pores, cavities etc.) or in terms of material composition (displaceable material or separable materials).

Examples of solid materials of the second object comprise materials that are not thermoplastic or material that are thermoplastic but have a higher glass transition temperature than thermoplastic material of the protrusion, for example higher by at least about 30°, etc.

In this text the expression "thermoplastic material being capable of being made flowable e.g. by mechanical vibration" or in short "liquefiable thermoplastic material" or "liquefiable material" or "thermoplastic" is used for describing a material comprising at least one thermoplastic component, which material becomes liquid (flowable) when heated, in particular when heated through friction i.e. when arranged at one of a pair of surfaces being in contact with each other and vibrationally moved relative to each other, wherein the frequency of the vibration has the properties discussed hereinbefore. In some situations, for example if the first object has to carry substantial loads, it may be advantageous if the material has a Young's modulus of more than 0.5 GPa. In other embodiments, the Young's modulus may be below this value.

Thermoplastic materials are well-known in the automotive and aviation industry. For the purpose of the method according to the present invention, especially thermoplastic materials known for applications in these industries may be used.

A thermoplastic material suitable for the method according to the invention is solid at room temperature (or at a temperature at which the method is carried out). It preferably comprises a polymeric phase (especially C, P, S or Si chain based) that transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic material will generally comprise a polymeric component that is not cross-linked covalently or cross-linked in a manner that the cross-linking bonds open reversibly upon heating to or above a melting temperature range. The polymer material may further comprise a filler, e.g. fibres or particles of material which has no thermoplastic properties or has thermoplastic properties including a melting temperature range which is considerably higher than the melting temperature range of the basic polymer.

In this text, generally a "non-liquefiable" material is a material that does not liquefy at temperatures reached during the process, thus especially at temperatures at which the thermoplastic material of the first object is liquefied. This does not exclude the possibility that the non-liquefiable material would be capable of liquefying at temperatures that are not reached during the process, generally far (for example by at least 30°, at least 50° or at least 80° C.) above a liquefaction temperature of the thermoplastic material or thermoplastic materials liquefied during the process. The liquefaction temperature is the melting temperature for crystalline polymers. For amorphous thermoplastics the liquefaction temperature (also called "melting temperature in this text") is a temperature above the glass transition temperature at which the becomes sufficiently flowable, sometimes referred to as the 'flow temperature' (sometimes defined as the lowest temperature at which extrusion is possible), for example the temperature at which the viscosity drops to below 104 Pa*s (in embodiments, especially with polymers substantially without fiber reinforcement, to below 103 Pa*s)), of the thermoplastic material.

For example, a non-liquefiable material may be a metal, such as aluminum or steel, or wood, or a hard plastic, for example a reinforced or not reinforced thermosetting polymer or a reinforced or not reinforced thermoplastic with a melting temperature (and/or glass transition temperature) considerably higher than the melting temperature/glass transition temperature of the liquefiable part, for example with a melting temperature and/or glass transition temperature higher by at least 50° C. or 80° C. or 100° C.

Specific embodiments of thermoplastic materials are: Polyetherketone (PEEK), polyesters, such as polybutylene terephthalate (PBT) or Polyethylenterephthalat (PET), Polyetherimide, a polyamide, for example Polyamide 12, Polyamide 11, Polyamide 6, or Polyamide 66, Polymethylmethacrylate (PMMA), Polyoxymethylene, or polycarbonateurethane, a polycarbonate or a polyester carbonate, or also an acrylonitrile butadiene styrene (ABS), an Acrylester-Styrol-Acrylnitril (ASA), Styrene-acrylonitrile, polyvinyl chloride, polyethylene, polypropylene, and polystyrene, or copolymers or mixtures of these.

In addition to the thermoplastic polymer, the thermoplastic material of the first object may also comprise a suitable filler, for example reinforcing fibers, such as glass and/or carbon fibers. The fibers may be short fibers. Long fibers or continuous fibers may be used especially for portions of the first and/or of the second object that are not liquefied during the process.

The fiber material (if any) may be any material known for fiber reinforcement, especially carbon, glass, Kevlar, ceramic, e.g. mullite, silicon carbide or silicon nitride, high-strength polyethylene (Dyneema), etc.

Other fillers, not having the shapes of fibers, are also possible, for example powder particles.

Mechanical vibration or oscillation suitable for embodiments of the method according to the invention has preferably a frequency between 2 and 200 kHz (even more preferably between 10 and 100 kHz, or between 20 and 40 kHz) and a vibration energy of 0.2 to 20 W per square millimeter of active surface. The vibrating tool (e.g. sonotrode) is e.g. designed such that its coupling-out face oscillates predominantly in the direction of the tool axis (longitudinal vibration) and with an amplitude of between 1 and 100 μm, preferably around 30 to 80 μm. Such preferred vibrations are e.g. produced by ultrasonic devices as e.g. known from ultrasonic welding.

In this text, the terms "proximal" and "distal" are used to refer to directions and locations, namely "proximal" is the side of the bond from which an operator or machine applies the mechanical vibrations, whereas distal is the opposite side.

In this text, generally the term "underneath" a layer is meant to designate a space distally of this layer if the proximal side being defined to be the side of the layer from which it is accessed during the process. The term "underneath" thus is not meant to refer to the orientation in the earth gravity field during the manufacturing process.

BRIEF DESCRIPTION OF THE DRAWINGS

In the following, ways to carry out the invention and embodiments are described referring to drawings. The drawings are schematical. In the drawings, same reference numerals refer to same or analogous elements. The drawings show:

FIG. 1 a connector suitable as first object in a method as described in this text;

FIG. 2 a connector of the kind shown in FIG. 1 during an early stage of the anchoring process;

FIG. 4 the connector of FIG. 2 after the anchoring process;

FIGS. 5-8 further embodiments of connectors;

DESCRIPTION OF THE PREFERRED EMBODIMENTS

Figure 3:
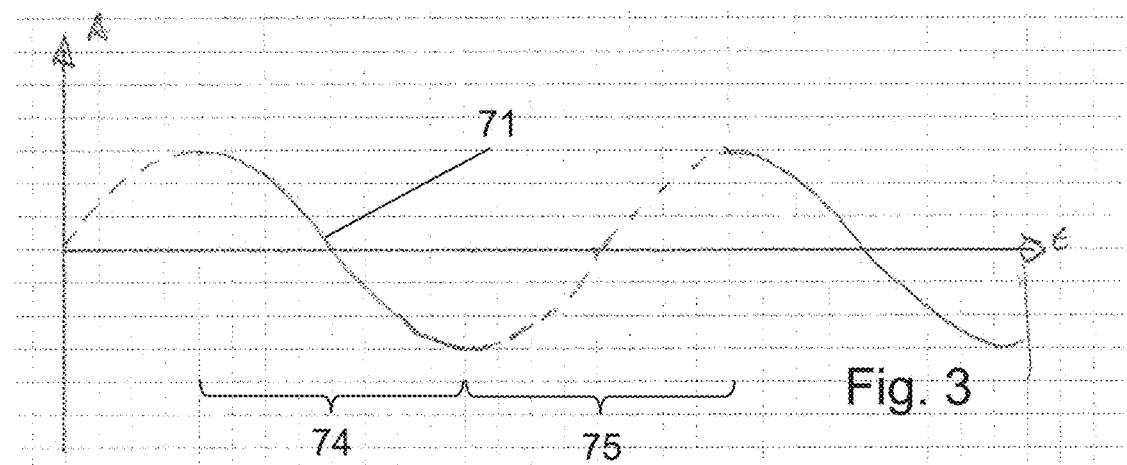
FIG. 3 phases of vibration cycles.

The first object 1 shown in FIG. 1 is overall sleeve-shaped with a body 11 of a thermoplastic material extending along an axis 10 between a proximal end face 15 and a distal end 14, here being a circular edge. In the depicted embodiment, the body is tube-like with an inner through opening (lumen) 16 extending axially through the entire body 11. The first object further has a plurality of (about ten) relatively steep helical protrusions 12 being ribs of the same thermoplastic material extending along the circumferential surface of the body 11. The body 11 has a proximal collar 13 and an anchoring portion 20 extending distally from the collar, the anchoring portion carrying the protrusions 12. The anchoring portion has a generally cylindrical lateral outer surface from which the protrusions extend. An outer diameter of the anchoring portion 20 is smaller than an outer diameter of the collar 13. In the depicted embodiment, the collar 13 has a radial extension that is larger than a radial extension of the protrusions 12. In alternative embodiments, the collar may have a radial extension that corresponds to the radial extension of the protrusions, see for example FIG. 6 described hereinafter.

FIG. 1 also illustrates that the protrusions may have the optional feature of forming a distal bevel 45, i.e. a distal end of the protrusions is not perpendicular to the axis but is at an angle to the plane perpendicular to the axis. The angle may for example be greater (i.e. the bevel 45 may be steeper) for comparably hard second objects material. The bevel prevents the distal end of the protrusions 12 from impeding a rotation of the first object relative to the second object when driven forward into the second object in the process described in this text. A bevel angle (angle to the plane perpendicular to the axis) may especially be between 10° and 70°.

For anchoring in a second object 2 of a low-strength brittle or elastic material, such as a brittle foam, optionally in a first step an opening 22 may be pre-drilled into the proximally facing surface 21 of the second object 2 into which the first object is to be driven for being anchored. A cross section of the opening 22 in this is smaller than an outer cross section of the first object 1, i.e., a radius of the opening 22 is smaller than an outer radius of the helical protrusions 12 and often also equal to or smaller than a radius of the circumferential first object surface from which the protrusions 12 extend outwardly.

In a next step, the first object 1 is positioned relative to the second object 2 with the distal end 14 or a region near to it being brought into contact with the second object, if applicable at the mouth of the opening 22. This is shown in FIG. 2. Then, a sonotrode 6 is used to couple mechanical vibration into the first object, via the proximal end face 15 by holding a distally facing coupling-out face 61 against the proximal end face 15. The sonotrode may especially be subject to ultrasonic vibrations, i.e. vibrations with a frequency of about 20 kHz or more.

In the depicted configuration, the sonotrode 6 has a guiding protrusion 66 engaging with a corresponding feature of the first object 1, here with the through opening 16.

In other embodiments (see for example FIG. 9 described hereinafter), the sonotrode does not have such guiding protrusion but has a distal outcoupling face that is essentially flat where it is in contact with the first object. Such configuration may especially be advantageous if the hole in the second object, in which the first object is anchored, is pre-made. A configuration with a flat sonotrode prevents situations in which the system is overdetermined (such overdetermination could lead to asymmetries and stress in the system after anchoring).

The coupling between the sonotrode 6 and the first object 1 may, especially if the second object material is substantially not elastic but for example brittle, such that retracting movements (movements into proximal directions) of the sonotrode are not coupled into the first object 1. Rather, the sonotrode 'hammers' onto the proximal end face 15. FIG. 3 schematically illustrates the deflection A of the vibrating sonotrode as a function of time t. FIG. 3 illustrates that only forward movements (forward part 74 of the vibration cycle; solid line) are coupled into the first object, whereas backward movements (retraction part of the vibration cycle 75; dashed line) are not coupled into the first object. By applying a slight pressing force on the sonotrode—this pressing force may for example, depending on the chosen configuration, be the just the weight of the apparatus by which the vibration is applied and which comprises the sonotrode—the sonotrode is caused to move up during the backward movement parts of the cycle. This results in driving of the first object into the second object by hammering. The first object in these embodiments is thus subject to a slip-stick kind of movement relative to the second object. Due to the helical, protrusions 12, the driving into the second object causes a rotational movement 40 also. In contrast to prior art approaches, however, this rotational movement is not caused by any angular momentum applied actively by any tool but just results from the combined effect of the effect of the longitudinal vibration of the sonotrode and the helical protrusions.

The helical shape of the protrusions couples rotation and axial translation. Optimizing of the helix angle (this may optionally pertain to any embodiment) may consider the criterion that the steeper the helix angle, the easier the implementation of the "hammering" effect. Thus, for high resistance material, the helix angle may need to be chosen to be steeper than for materials offering less resistance.

FIG. 4 illustrates the situation after the anchoring process for the example of an embodiment in which the second object has substantial rigidity, for example by being of a brittle material of the kind mentioned hereinbefore. In such embodiments, the motion of the first object subject to the vibrations causes substantial friction at the interface between the first and second objects. As a consequence, thermoplastic material of the protrusions and, depending on the depth of the opening 22 in relation to the anchoring depth, also at the distal end 14 of the first object 1, during the process was made flowable (flow portion 8) and has interpenetrated structures of the second object to yield, after re-solidification, a positive fit connection between the first and second objects that in addition to the anchoring by the helical protrusions contributes to the stability of the connection.

FIG. 5 shows a variant of a first object 1 (connector). Compared to the first object 1 of FIG. 1, the first object 1 of FIG. 5 has a different ratio between length and radial extension.

Also, independently therefrom, the proximal collar is provided with a rib structure 17. The ribs of the rib structure 17 has energy directing properties and thus serve to cause additional liquefaction when the proximal collar gets into contact with material of the second object while being subject to the mechanical vibration. This yields an additional anchoring effect at the mouth of the opening in the second object, independent of whether an opening 22 is pre-drilled into it or not. Especially, configurations with an energy directing structure of the collar as the rib structure 17 shown in FIG. 5 are suited for second objects with a hard layer constituting the proximal surface. For example, the second object may be a lightweight building element in which the comparably weak and brittle or elastic material is sandwiched between hard, thin and dense building layers, wherein the collar with the energy directing structure is anchored relative to a first, proximal building layer in which the mouth of the opening for the first object is present.

FIG. 5 also shows the definition of the helix angle $\alpha$ used in this text. The embodiment of FIG. 5 has a helix angle of about $\alpha=50°$. The helix angle can be chosen depending on the composition of the second object and of the specific requirements and can be chosen independently of the other properties, especially independent of the presence of a collar with energy directing structures. The helix angle can especially vary between steep (about 80° and relatively flat (down to about 40° or even to 350 or 30° or 20°).

FIG. 6 shows a further embodiment of a first object 1. Compared to the embodiment of FIG. 5, the embodiment does not have a collar. Instead, the distal end is provided with a plurality of teeth 18.

Figure 7:
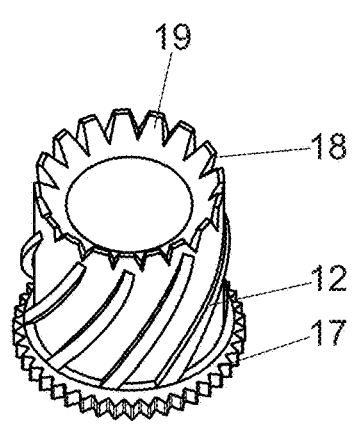

FIG. 7 depicts, from another angle, an embodiment with both, a collar with energy directing structures (rib structure 17) as the embodiment of FIG. 5 and with a distal end having a toothed crown as the embodiment of FIG. 6. The teeth 18 form an inner conical surface 19 and are, due to their shape, overall energy directing. The teeth have the function of penetrating into the material of the second object 2. Especially, the energy directing properties ensures anchoring of the distal end of the connector in for example harder and/or more dense material of the second object at a the bottom of the opening (if applicable) and/or for example in a harder layer of the second object. Such harder layer may for example be a distal building layer of the second object if the second object is a lightweight building element sandwiching a (low strength, for example brittle or elastic) interlining layer between a proximal and a distal building layer.

Figure 8:
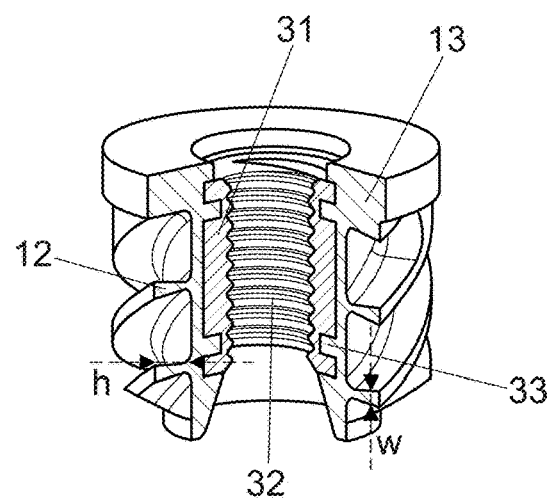

FIG. 8 shows the option of providing the first object (especially connector) with a body 31 of a non-liquefiable material. For example, such body may be a metallic insert with an inner thread 32 or other fastening structure. The body may have engagement structures 33 for the material of the thermoplastic portion of the first object to engage so that the thermoplastic portion and the non-liquefiable portion are secured to each other in a positive-fit manner. In the shown embodiment, the engagement structures 33 comprise circumferential grooves into which thermoplastic material of the thermoplastic portion engages.

More in general, the body 31 of non-liquefiable material may constitute an inner portion of the first object, and be circumferentially enclosed by the thermoplastic portion, as is shown in FIG. 8.

In FIG. 8, the height h (or depth) and width w of the protrusions 12 are also illustrated. Generally, and independently of whether or not the first object has a body of non-liquefiable material, the aspect ratio h/w of the protrusions 12 may depend on material parameters. In many embodiments, the aspect ratio is at least 1, for example 1.5 or more. Embodiments of first objects are possible in which the aspect ratio is even much higher, for example at least 3 or even 5 or more, whereby the helical protrusions 12 have more a character of being wings than ribs, see also FIGS. 10 and 11 described hereinbelow.

Also the cross section of the protrusion may be optimized depending on the requirements. In many embodiments, however, the cross section is different from a cross section of a thread ridge, which is often approximately triangular with the width continuously decreasing towards radially-outward. The cross section of the protrusion 12 of the embodiment of FIG. 8 (and similarly of FIGS. 1, 5 and 6 and of other embodiments) is approximately rectangular, with the width w slightly increasing towards radially-outward. More in general, in at least one radial range (region), the width of the protrusion may be constant or even increase as a function of the distance to the axis 10.

Figure 9:
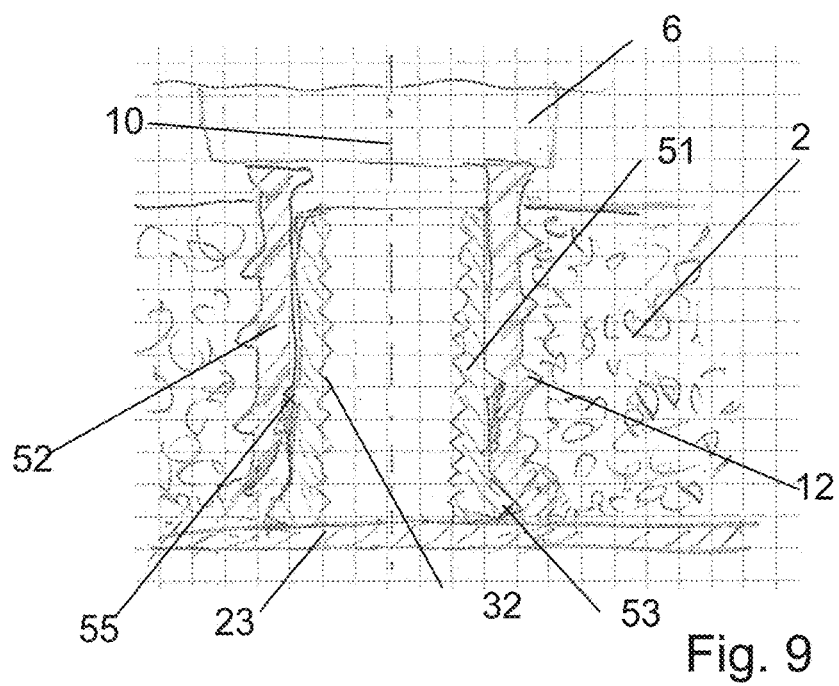
FIG. 9 a configuration with an inner connector element and an outer sleeve.

FIG. 9 shows a further variant in which the body of the non-liquefiable material is an initially separate part, namely an inner connector element 51 with the inner thread 32. The thermoplastic portion is then provided as an initially separate thermoplastic sleeve 52 enclosing the connector element 51. For the process, firstly the connector element is positioned in a suitably prepared opening in the second object 2, in a manner that it is supported towards distally. For example, as shown in FIG. 9, the connector element may rest against a stable layer, such as a distal building layer 23 of the second object.

The inner connector element 51 has a proximally facing support face, formed by a circumferential outward bulge 53. During the process, once the distal end face of the sleeve 52 reaches the support face, the distal end face is pressed against the support face, whereby material is liquefied at the interface between the support face and the distal end face, and is caused to flow radially outward with to penetrate into structures of the second object, as for example also described in Swiss patent application 00871/18.

This effect of a support face of an initially separate connector element may especially assist the anchoring process towards its end. Thus, it is possible that the distal end of the thermoplastic sleeve initially is not in contact with the support face, and the process is essentially as described hereinbefore referring to FIGS. 2-4 during this initial phase. Only towards the end of the process, in the configuration of FIG. 9, does the distal end face of the connector reach the support face, whereby the mentioned additional effect is achieved.

Alternatively, it would be possible to insert the connector element and the thermoplastic sleeve with the distal end face of the sleeve in contact with the support face, and without the connector element being supported by a particularly stable layer of the second object. Then, the connector element 51 and the thermoplastic sleeve 52 are pressed further into the second object together, with some mechanical resistance encountered by the connector element 51, whereby the relative force between the distal end face of the thermoplastic sleeve and the support face is generated.

In order for the connector element to be held stably relative to the thermoplastic sleeve after the anchoring process, the connector element 51 and/or the thermoplastic sleeve may comprise axial retention structures, such as a circumferential rib 55 of the connector element. During the process, due to absorbed vibration energy, thermoplastic material of the sleeve in a vicinity of such retention structure becomes flowable to embed it after re-solidification.

For stability of the connector element relative to the thermoplastic sleeve with respect to rotations, according to a first possibility the connector element and the sleeve comprise an axially running rib-groove connection. Then, during insertion, when the sleeve rotates due to the helical protrusions 12, the connector is subject to a same rotation as the sleeve. According to a second possibility, the sleeve is allowed to rotate relative to the connector during insertion, and is only rotationally secured relative thereto towards the end of the process by the support face, formed by the outward bulge 53, having retention structures that are not rotationally symmetrical, liquefied thermoplastic material of the sleeve interpenetrating the retention structures to form, with the retention structures, after re-solidification, a positive fit connection with respect to rotational movements.

Figure 10:
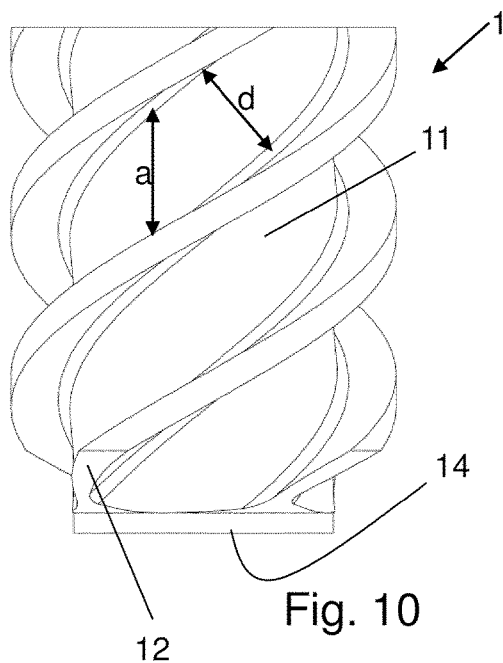
FIGS. 10 and 11 yet further embodiments of connectors.

The embodiment of a first object (for example connector) shown in FIG. 10 compared to the embodiment of FIG. 1 has protrusions 12 with a higher aspect ratio and with a smaller helix angle—i.e., the protrusions are more pronounced, wing-like ribs with less steep helix. Compared to the embodiment of FIG. 1 the first object of FIG. 10 is suitable for softer and/or less strong second object material.

FIG. 10 illustrates a further being an optional feature of any embodiment of the invention. In contrast to threads according to the prior art, the protrusions do not form a sawtooth (or similar) cross section but are arranged at a distance d from each other, so that the valleys between the protrusions have a flat ground (i.e. a ground following the surface of a circular cylinder). Thereby, it is ensured that a substantial volume of foam is between the protrusions. It has been found that especially in brittle second object material this may be an important property. For pullout stability, the axial distance a (related to the distance d via the helix angle) may be an interesting parameter also.

In embodiments, for brittle second object materials lower limits for the distance are 2.5 mm or 3.5 mm, with 2.8 mm-6.5 mm being often ideal; for the axial distance a, a lower limit may be 3 mm or 4 mm.

Figure 11:
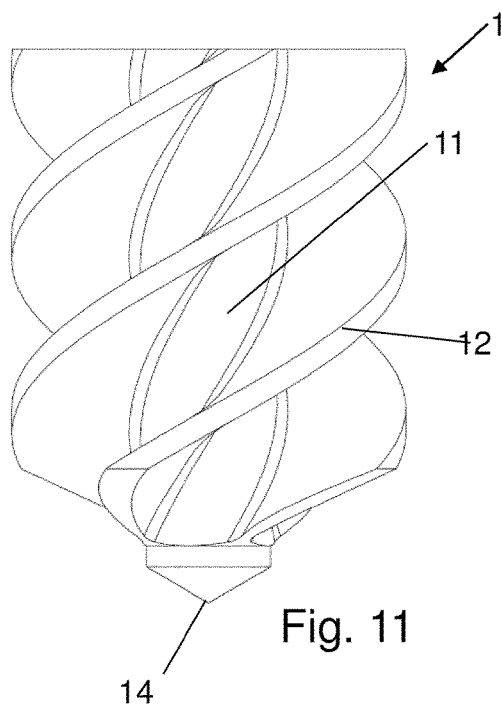

The embodiment of FIG. 11 has protrusions 12 with an even higher aspect ratio. The body 11 is accordingly thinner compared to the previously described embodiments.

Also, independently of this, the body is not tube-shaped but rather pin-shaped.

Further, the distal end 14 is not an edge but forms a tip. Generally, first objects ending in a tip or other structure are an alternative to connectors forming a punching edge. Especially, if the first object is to be used in a method without pre-drilling, the first object in many embodiments has a distal edge or tip, with tips being an option especially for thinner bodies 11. In embodiments that involve pre-drilling of the opening, the shape of the distal end may be chosen freely if not liquefaction/interpenetration at the distal end is desired, and may be optimized in terms of liquefaction/anchoring at the distal end if such anchoring by interpenetration is desired.

The embodiment of FIG. 11 may especially be suited for anchoring in softer foam, whereas for more brittle second objects, first object shapes with less high protrusions are often preferred.

Figure 12:
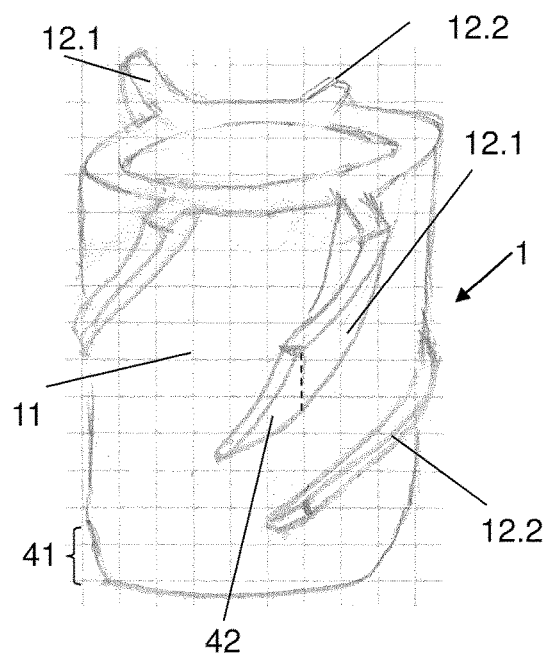
FIG. 12 an even further embodiment of a connector.

The embodiment of FIG. 12 has, compared to the embodiment of FIG. 1, the following features:

The first object does not have a proximal collar. In the shown embodiment, the protrusions 12.1, 12.2 extend to the proximal end. In variants (also without the proximal collar), the protrusions could extend only to a position at a distance from the proximal end, the first object could have a collar, or a configuration of the kind shown in FIG. 5 or a configuration of the kind shown in FIG. 6 (at the respective proximal ends of the first object 1) could be present.

The protrusions do not extend to the distal end. Rather, the body 11 has a distal portion that is free of protrusions, which portion serves for guiding the first object relative to the second object when the first object is introduced in the opening in the second object and during penetration further thereinto under the effect of the vibrations. In FIG. 12, this distal guiding portion 41 is slightly tapered, this being an optional feature.

The first object 1 has two kinds of protrusions 12.1, 12.2 of different heights and consequently, given an approximately same widths, of different aspect ratios.

The first object has protrusions that extend to towards distally to different extents. I.e. some of the protrusions 12.2 extend further towards distally than other protrusions 12.1. In the embodiment of FIG. 12, the higher protrusions 12.1 extend less far than the less high protrusions 12.2.

The first object has protrusions 12.1 that do not have a uniform height but that have a distal portion 42 tapering off towards distally.

These features are independent of each other and do not need to be combined. For example the first object may have protrusions of different heights (or more generally: of different cross sections/envelopes) without the feature of different extensions towards distally and/or without the distal guiding portion 41. Or the first object may have protrusions the cross section of which increases as a function of the distance to the distal end with or without there being different kinds of protrusions and with or without the distal guiding portion. Etc.

Further optional features, that can be combined with any one or any combination of the above features, include A surface roughening of the protrusions, for example towards their distal ends. Such surface roughening may be beneficial in having an energy directing effect so as to enhance liquefaction of a flow portion of the material of the protrusions, which flow portion may subsequently penetrate into structures of the second object to yield, after re-solidification a positive-fit connection, which enhances the anchoring strength and especially secures the anchored first object against rotation relative to the second object.

A variation of an other property of the protrusions different from their height as a function of the position along the helix, for example it thickness. More in general, the cross section area of at least one protrusion may increase as a function of a distance to the distal end.

Figure 13:
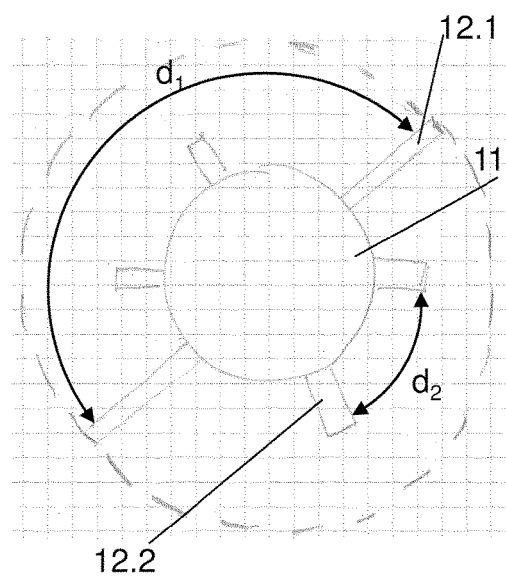
FIG. 13 a schematic horizontal cross section of a connector having different protrusions.

FIG. 13 schematically illustrates the principle of the first object having large height protrusions 12.1 as well as small height protrusions 12.2, similar to the embodiment of FIG. 12. The large height protrusions 12.1 have the advantage of ensuring secure anchoring even in very brittle second object material. The volume of material between large height protrusions 12.1, which material prevents any undesired slipping rotation of the first object relative to the second object, is high. This is illustrated in FIG. 13 by the distance $d_1$ between the large height protrusions 12.1. Because the large height protrusions 12.1 may have a high aspect ratio, they may, however, have a higher tendency to be subject to material failure, for example during the anchoring process when the material tends to be warmer than room temperature due to the energy absorbed. The small-height protrusions 12.2, being more dense by being at a smaller distance $d_2$ relative to each other and to the large height protrusions add to the stability of the first object by yielding additional stability against undesired movement of the body 11 relative to the protrusions 12.1, 12.2.

Figure 14:
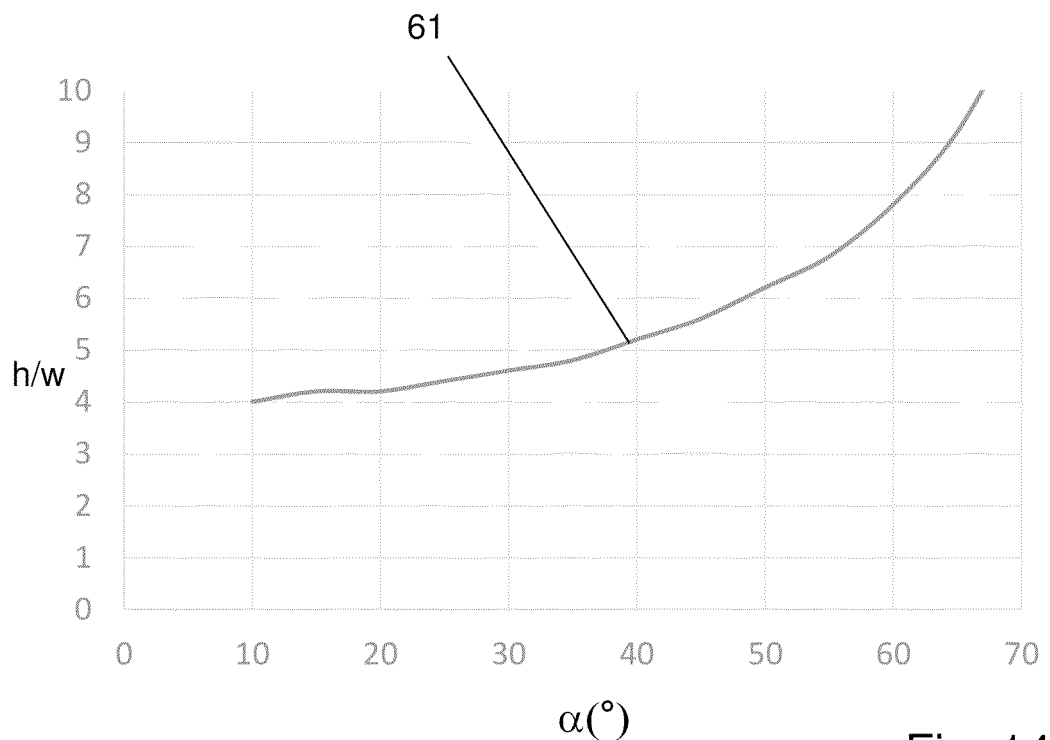
FIG. 14 a curve schematically illustrating a possible dependence of a maximum aspect ratio on the helix angle.
Figure 15:
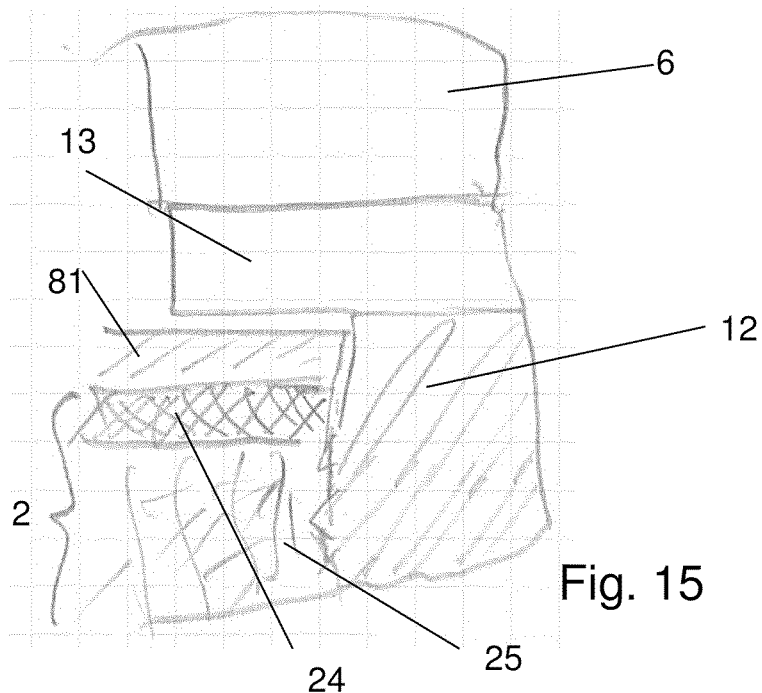
FIG. 15 the principle of using a laterally protruding feature of the first object to secure a third object to the second object.

The aspect ratio of the protrusions will generally depend on the first and especially second object materials. It may also depend on the helix angle. Especially, for high helix angles the aspect ratio may be higher than for smaller helix angle, because for a higher helix angle the load on the protrusions relative to the body is higher both, during insertion and also in response to axial loads thereafter. FIG. 14 illustrates this principle by illustrating a possible maximum aspect ratio h/w as a function of the helix angle $\alpha$. As becomes clear from the figure, the maximum aspect ratio increases as a function of the helix angle $\alpha$ FIG. 15 yet illustrates two optional features that are independent of each other and that can be combined with any other features described referring to the previous embodiment.

Firstly, the second object 2 comprises a comparably dimensionally stable proximal outer building layer 24 distally of which a for example more brittle interlining layer 25 is arranged. For example, the second object may be a lightweight building element of the herein described kind.

Secondly, the proximal collar 13 of the first object is used as a kind of head for securing a third, further object 81 to the second object.

In this kind of connections between the second object and a further object by the first object (being a connector), the first object serves as a kind of fixation element directly fixing the third object to the second object. This approach is an option in any embodiment, independent of the structure of the anchoring portion, which goes into the opening. In many embodiments, the requirement is that the first object has, proximally of the anchoring portion, a laterally protruding feature, such as the collar 13.

What is claimed is:

1. A method of anchoring a first object in a second object, the method comprising:
   providing the first object, the first object extending along an axis between a proximal end and a distal end and having a circumferential surface extending around the axis, the circumferential surface comprising at least one helical protrusion of a first material,
   wherein the first material is a thermoplastic material;
   providing the second object, the second object comprising a porous material that is brittle;
   bringing the first object in contact with the second object;
   coupling mechanical vibration into the first object to cause the first object to be subject to a helical movement relative to the second object; and
   driving the first object with the at least one helical protrusion into the second object, wherein the driving of the at least one helical protrusion into the material of the second object causes the material of the second object to be abraded where the at least one helical protrusions drives into it so that the at least one helical protrusion creates a groove, the groove extending helically into the second object, wherein the mechanical vibration causes at least some of the thermoplastic material of the at least one helical protrusion to become flowable and to penetrate into the pores of the material of the second object to yield, after re-solidification, a positive fit connection with the second object.

2. The method according to claim 1, wherein the circumferential surface comprises the thermoplastic material.

3. The method according to claim 1, wherein the second object remains solid around the groove.

4. The method according to claim 1, wherein coupling the mechanical vibration into the first object comprises holding a coupling-out face of a vibrating sonotrode against the proximally facing coupling-in face by a pressing force.

5. The method according to claim 4, wherein during coupling the mechanical vibration into the first object at least one of the following occurs;

the vibrating sonotrode is subject to longitudinal vibration;

there is a purely axial coupling between the vibrating sonotrode and the first object, without any torque transmitted from the vibrating sonotrode onto the first object;

the coupling-out face of the vibrating sonotrode is caused to hammer onto the proximally facing coupling-in face of the first object so as to cause a slip-stick movement of the first object relative to the second object; or the coupling-out face of the vibrating sonotrode includes a guiding protrusion that engages into an opening in the proximally facing coupling-in face.

6. The method according to claim 1, wherein the second object is at least one of:

a lightweight building element with a low-density interlining layer sandwiched between a first and second building layer of higher density and strength than the low-density interlining layer; and a hard foam.

7. The method according to claim 1, wherein the first object is a connector comprising a connecting structure.

8. The method according to claim 1, wherein the proximally facing coupling-in face of the first object is a proximal end face defining the proximal end.

9. The method according to claim 1, wherein coupling of the mechanical vibration into the first object causes the first object to advance into an opening in the second object to be anchored therein.

10. The method according to claim 9, comprising pre-making the opening in the second object prior to bringing the first object in contact with the second object, wherein a depth of the opening is smaller than an axial extension of the first object.

11. The method according to claim 9, wherein the first object has a proximal collar with proximal energy directing structures, and wherein the method comprises causing the proximal collar to be in physical contact with a mouth of the opening during coupling of the mechanical vibration into the first object to cause a thermoplastic material of the proximal collar to become flowable and to interpenetrate structures of the second object around the mouth.

12. The method according to claim 9, wherein the opening is cylindrical.

13. The method according to claim 1, wherein a lateral surface from which the at least one helical protrusion extends is cylindrical.

14. The method according to claim 1, wherein the first object has a proximal collar and an anchoring portion extending distally from the proximal collar, the at least one helical protrusion extending radially outwardly from the anchoring portion.

15. The method according to claim 1, wherein the distal end of the first object has distal energy directing structures of a thermoplastic material, and wherein coupling of the mechanical vibration into the first object causes the thermoplastic material of the distal energy directing structures to become flowable and to interpenetrate structures of the second object at the distal end of the first object.

16. The method according to claim 1, comprising at least one of:

coupling a pressing force on the first object relative to the second object while the mechanical vibration is coupled into the first object, wherein the pressing force is exerted onto the first object until the proximal end of the first object is flush with a proximally facing surface of the second object; or providing an inner connector element with a circumferential connector element surface and a proximally facing support face at a periphery of the circumferential connector element surface, wherein the first object is sleeve-shaped and equipped to enclose the circumferential connector element surface, the method further comprising positioning the inner connector element relative to the second object, wherein during coupling of the mechanical vibration and the pressing force into the first object, a face of the first object is pressed against the proximally facing support face of the inner connector element to cause a thermoplastic material of the first object to liquefy at an interface with the proximally facing support face, and to be directed radially outwardly into structures of the second object.

17. The method according to claim 1, wherein the mechanical vibration is coupled into the first object by a sonotrode, and wherein the sonotrode has a flat distal end without any guiding features engaging into structures of the first object.

* * * * *